(12) United States Patent
Agarwal et al.

(10) Patent No.: US 8,665,948 B2
(45) Date of Patent: Mar. 4, 2014

(54) ADAPTIVE RATE CONTROL TO COVER MULTIPLE ENCODING STANDARDS

(75) Inventors: Megha Agarwal, Calcutta (IN); Sumit Johar, New Delhi (IN); Saha Kaushik, Shamnath Marg (IN); Emiliano Mario Piccinelli, Cavengo di Branza (IT)

(73) Assignees: STMicroelectronics International N.V., Amsterdam (NL); STMicroelectronics S.r.l., Agrate Brianza (IT)

( * ) Notice: Subject to any disclaimer, the term of this patent is extended or adjusted under 35 U.S.C. 154(b) by 1053 days.

(21) Appl. No.: 12/275,947

(22) Filed: Nov. 21, 2008

(65) Prior Publication Data

US 2009/0154558 A1     Jun. 18, 2009

(30) Foreign Application Priority Data

Nov. 23, 2007  (IN) .......................... 2452/DEL/2007
Nov. 21, 2008  (IN) .......................... 2452/DEL/2007

(51) Int. Cl.
*H04N 7/12*   (2006.01)
*H04N 11/12*  (2006.01)

(52) U.S. Cl.
USPC ................................ 375/240.03; 375/240.09

(58) Field of Classification Search
USPC ............. 375/240.03, 240.01, 240.02, 240.04, 375/240.05
See application file for complete search history.

(56) References Cited

U.S. PATENT DOCUMENTS

| | | | |
|---|---|---|---|
| 2004/0081236 A1* | 4/2004 | Seo ......................... | 375/240.03 |
| 2005/0201460 A1* | 9/2005 | Kang et al. ............... | 375/240.03 |
| 2006/0257034 A1* | 11/2006 | Gish et al. ................... | 382/239 |
| 2007/0030902 A1* | 2/2007 | Winger et al. ........... | 375/240.16 |
| 2007/0071094 A1* | 3/2007 | Takeda et al. ............ | 375/240.04 |
| 2007/0177665 A1* | 8/2007 | Zhou et al. ............... | 375/240.03 |
| 2008/0031337 A1* | 2/2008 | Hasegawa et al. ....... | 375/240.16 |
| 2008/0192823 A1* | 8/2008 | Wang ....................... | 375/240.03 |
| 2008/0201748 A1* | 8/2008 | Hasek et al. .................... | 725/98 |

* cited by examiner

*Primary Examiner* — Eleni Shiferaw
*Assistant Examiner* — Abu Sholeman
(74) *Attorney, Agent, or Firm* — Gardere Wynne Sewell LLP; Andre M. Szuwalski (57) ABSTRACT

Rate control algorithms are adapted to cover multiple encoding standards. A rate controller includes an input adaptation interface, a core rate controller, and an output adaptation interface. The input adaptation interface converts rate control input parameters of a target encoding standard to corresponding native control input parameters of the rate controller. The core rate controller is coupled to the output of the input adaptation interface generating output parameters conforming to its native encoding standard. The output adaptation interface is coupled to the output of the core rate controller converting the generated output parameters to equivalent rate control output parameters conforming to the target encoding standard.

9 Claims, 8 Drawing Sheets

ADAPTIVE RATE CONTROL TO COVER MULTIPLE ENCODING STANDARDS

PRIORITY CLAIM

The present application claims priority from Indian Patent Application No. 2452/Del/2007 filed Nov. 21, 2008 and Indian Provisional Application No. 2452/Del/2007 filed Nov. 23, 2007, the disclosures of which are hereby incorporated by reference.

FIELD OF THE INVENTION

The present invention relates generally to digital video processing and more specifically to adapting rate control algorithms to work with multiple encoding standards.

BACKGROUND OF THE INVENTION

Digital communication and storage systems are in widespread use today and have replaced analog communication and storage systems. A vast majority of such systems incorporate encoding techniques to transmit or store information such as audio or video in digital format. These data encoding systems are used for efficient transmission and storage of digitized information. The encoding systems operate in accordance with a particular standard, e.g. MPEG-4. Data bit-rate is a primary constraining factor in the encoding process and every encoding system employs a Rate Controller (RC) which adjusts the operating parameters of the data encoder in accordance with the requirements of the application, the constraints of the standard and achievable bit-rate. The Rate Controller manages the encoding process, within the framework of constrained data bit-rate.

Rate-controllers can be broadly classified as either Constant Bitrate (CBR) controllers or as Variable Bitrate (VBR) controllers. Constant Bitrate (CBR) controllers enable constant-channel-bandwidth operation under variable encoding quality conditions. Variable Bitrate (VBR) controllers, on the other hand, maintain constant encoding quality using variable-channel-bandwidth.

At present, there are various encoding standards and rate control algorithms that are in use. Each rate controller is designed to work within the framework of a particular encoding standard and cannot be used for a different encoding standard.

SUMMARY

A rate controller comprises: an input adaptation interface converting rate control input parameters of a target encoding standard to corresponding native control input parameters of the rate controller; a core rate controller coupled to the output of said input adaptation interface generating output parameters conforming to its native encoding standard; and an output adaptation interface coupled to the output of the core rate controller converting the generated output parameters to equivalent rate control output parameters conforming to the target encoding standard.

The rate controller may be incorporated into a system.

In another embodiment, an apparatus comprises: a data encoder generating rate control input parameters of the target encoding standard; and a rate controller operatively coupled to receive said rate control input parameters, said rate controller comprising: an input adaptation interface for converting the received rate control input parameters to equivalent native control input parameters of the rate controller; a core rate controller coupled to the output of said input adaptation interface generating output rate control parameters conforming to its native encoding standard; and an output adaptation interface coupled to the output of the core rate controller converting the generated output parameters to equivalent rate control output parameters conforming to the target encoding standard, the output of said output adaptation unit being coupled to the rate control input of said data encoder.

In yet another embodiment, a method of adapting rate control algorithms to cover multiple encoding standards comprises: converting rate control input parameters of a target encoding standard to equivalent native control input parameters; generating output parameters conforming to the native encoding standard; and converting the generated output parameters to equivalent rate control output parameters conforming to the target encoding standard.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE DRAWINGS

The embodiments of the present disclosure are described in detail with reference to the accompanying drawings. However, the present disclosure is not limited to these embodiments which are only provided to explain more clearly the present disclosure to the ordinarily skilled in the art. In the accompanying drawings, like reference numerals are used to indicate like components.

The present disclosure teaches a rate controller that is adaptable for use with any data encoder. The rate controller receives input parameters for the target encoding standard through an Input Adaptation Interface which converts them into the corresponding native control parameters of the Rate Controller. An Output Adaptation Interface coupled to the output of the Rate Controller translates the rate control parameters generated by it to the equivalent rate control values conforming to the target encoding standard. Both the Input Adaptation Interface and the Output Adaptation Interface utilize statistical regression techniques for their operation.

Figure 1:
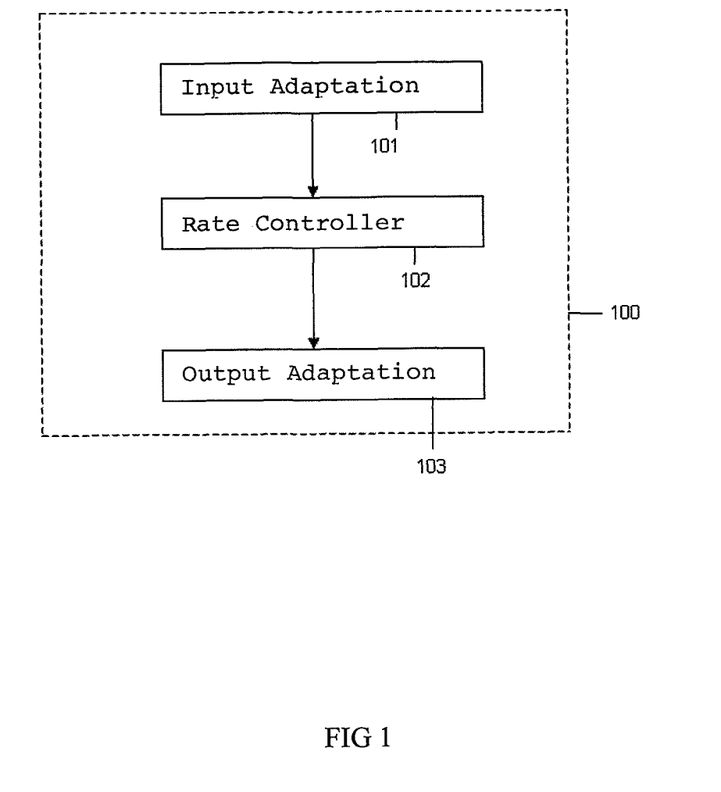
FIG. 1 illustrates a block diagram of a system for adapting a rate control algorithm according to another embodiment of the present disclosure.

FIG. 1 illustrates a block diagram of a system for adaptive rate control covering multiple encoding standards according to an embodiment of the present disclosure. It comprises an input adaptation interface 101 which receives rate control input parameters of the target encoding standard (generated by a data encoder) and converts these to corresponding native control input parameters of the rate controller. The rate controller 102 is a standard Rate Controller according to the known art. The output of Rate Controller 102 is coupled to Output Adaptation Interface 103 which converts the results provided by Rate Controller 102 into equivalent output rate control parameters conforming to the target encoding standard. The output of the output adaptation unit is coupled to the rate control input of the data encoder.

The input and output adaptation interfaces 101, 103 provide a transformation using statistical regression. This determines the relationship between the independent parameters of both the standards. For a constant bitrate (CBR) algorithm, bitrate is a dependent parameter whereas quantization parameter (QP) is an independent parameter. Similarly, for a variable bitrate (VBR) algorithm, quality will be the dependent parameter and QP will be the independent parameter. The derived relationship is used to adapt the input and output parameters from one standard to another.

As an example of the present disclosure, a constant bitrate algorithm developed for a native H.264 encoding standard is adapted to a target VC1 encoding standard. The constant bitrate control algorithm for the H.264 standard works at a macroblock level. For each macroblock, it receives the number of bits used to encode a previous macroblock as well as a quantization parameter of the previous macroblock as input. The input adaptation interface adapts the input it receives from the VC1 encoder to suit the H.264 rate controller. The number of bits is not standard dependent and is passed as such by the input adaptation interface. The quantization parameter provided by the VC1 encoder is mapped to H.264 quantization parameter which provides nearly the same bitrate.

The H.264 quantization parameter is then fed to the core rate controller. The core rate controller returns as output the quantization parameter to encode the current macroblock. The output adaptation interface adapts the inputs it receives from the core rate controller to suit the VC1 encoder.

Figure 2:
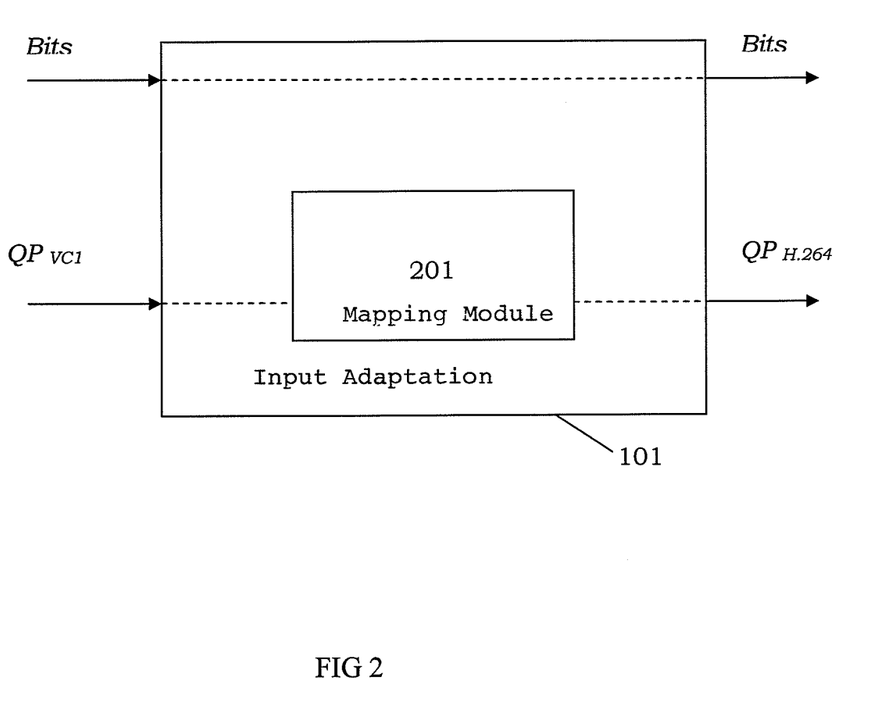
FIG. 2 illustrates a block diagram representation of an input adaptation interface according to an embodiment of the present disclosure.

FIG. 2 shows the block diagram of the Input Adaptation Interface 101 according to an embodiment of the present disclosure. It comprises a first mapping module 201, which maps the quantization parameter of the target encoding standard to the equivalent quantization parameter of the native encoding standard which provides nearly the same bitrate. As an example, the quantization parameter of a VC1 standard encoder is mapped to the quantization parameter of an H.264 standard encoder.

Figure 3:
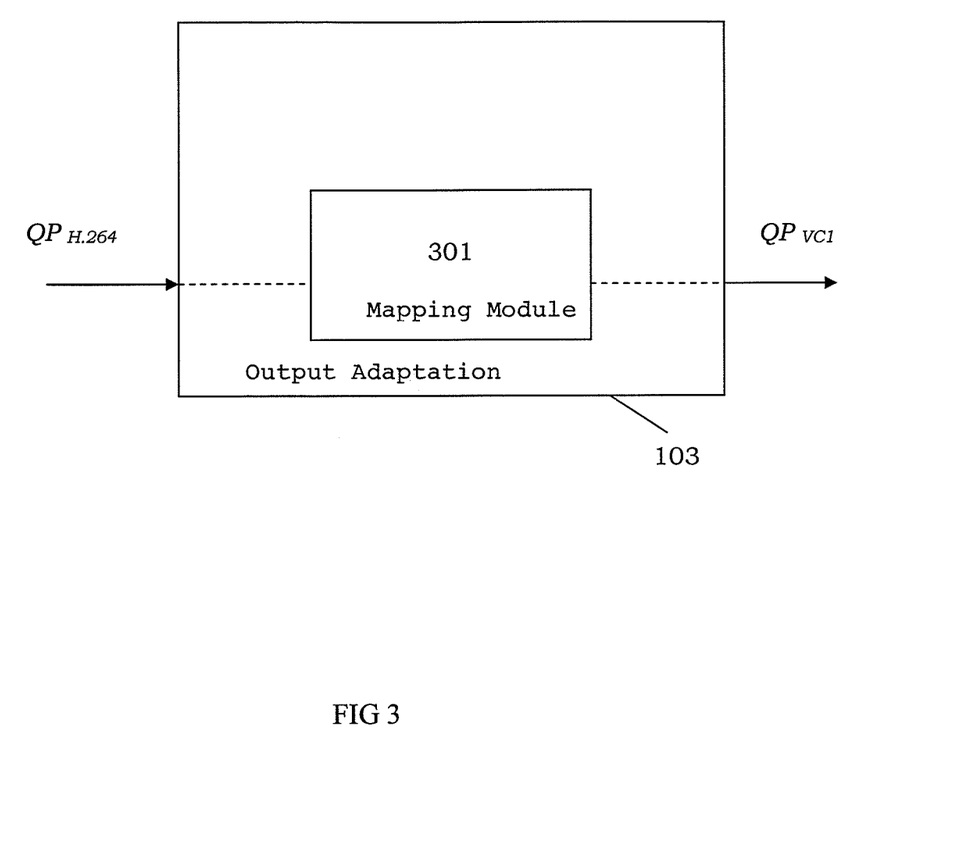
FIG. 3 illustrates a block diagram representation of an output adaptation interface according an embodiment of to the present disclosure.

FIG. 3 shows the block diagram of the Output Adaptation Interface 103 according to the present disclosure. It comprises a second mapping module 301, which maps the quantization parameter of the first encoding standard to the equivalent quantization parameter of the second encoding standard which provides nearly the same bitrate. As an example, the quantization parameter of the H.264 standard is mapped to the quantization parameter of the VC1 standard.

Figure 4:
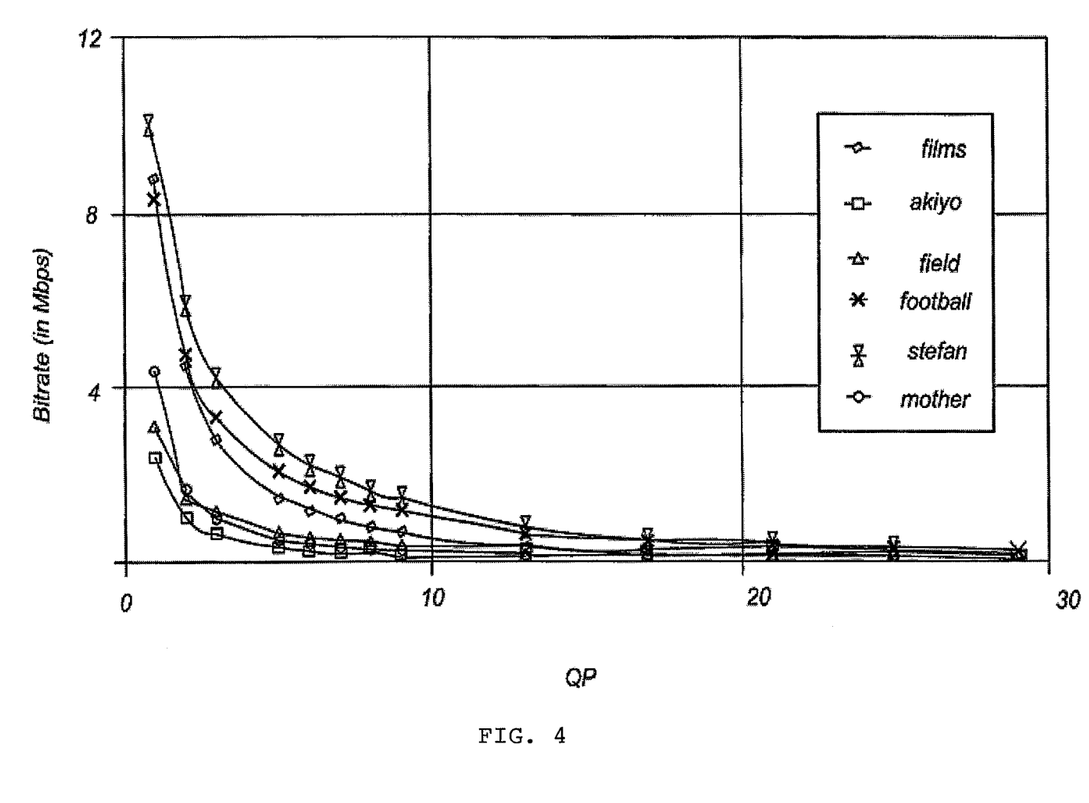
FIGS. 4 and 5 illustrate graphs showing achieved bitrates for VC1 and H.264 standards respectively for constant quantization parameters according to an embodiment of the present disclosure.
Figure 5:
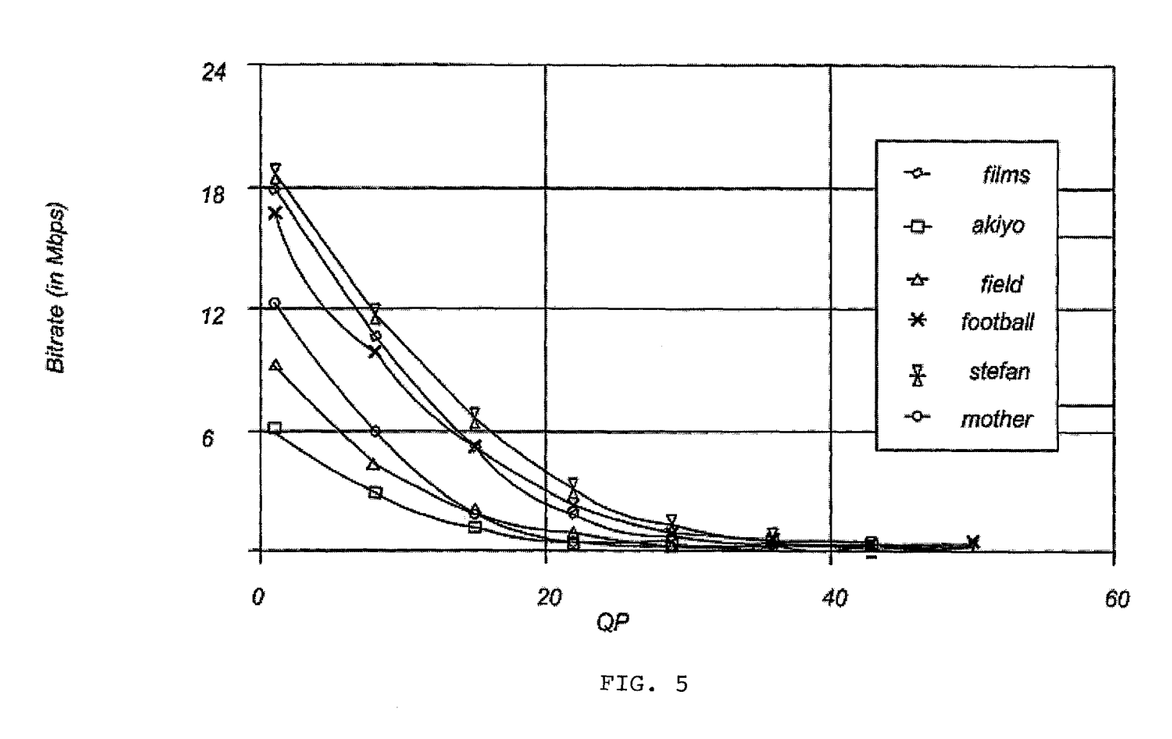

FIG. 4 and FIG. 5 illustrate graphs showing achieved bitrates for VC1 and H.264 standards respectively for constant quantization parameters according to an embodiment of the present disclosure.

Figure 6:
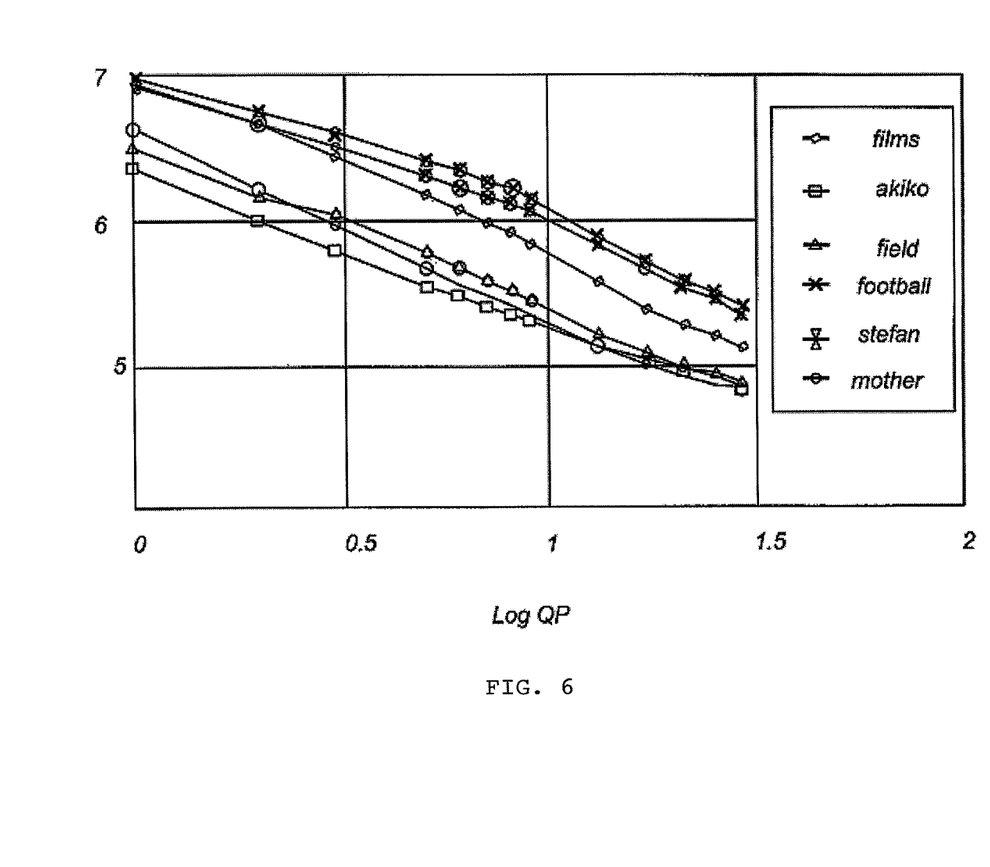
FIG. 6 illustrates a logarithmic plot of the bitrate and quantization parameter for VC1 standard according to an embodiment of the present disclosure.

FIG. 6 illustrates a logarithmic plot of the bitrate and the quantization parameter for the VC1 standard according to an embodiment of the present disclosure.

Figure 7:
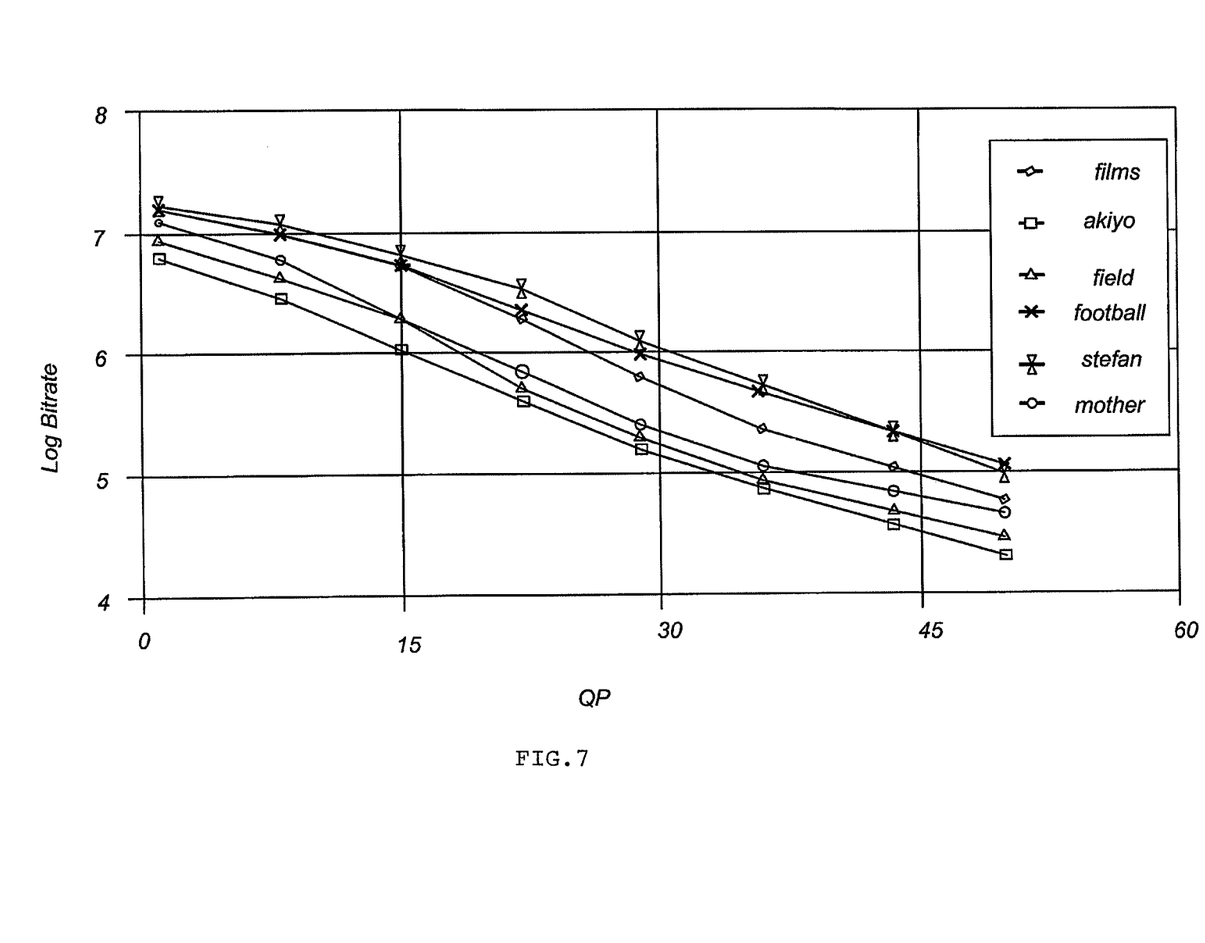
FIG. 7 illustrates a plot for the logarithmic bitrate and quantization parameter of the H.264 standard according to an embodiment of the present disclosure.

FIG. 7 illustrates a plot for the logarithmic bitrate and the quantization parameter of the H.264 standard according to an embodiment of the present disclosure. The plot may be approximated as:

$$\log(\text{bitrate}_{VC1}) = \text{Slope}_{VC1} * \log(qp_{VC1}) + \text{Intercept}_{VC1} \quad (1)$$

Similarly, the following expression approximates the result of applying a logarithmic regression to the Bitrate and QP plot of H.264:

$$\log(\text{bitrate}_{H.264}) = \text{Slope}_{H.264} * qp_{H.264} + \text{Intercept}_{H.264} \quad (2)$$

Equating the right hand side of (1) and (2) for the same bit-rate, simplifying and substituting the constants (from the observations) results in the following expression:

$$qp_{VC1} = 10^{0.0429 * qp_{H.264} - 0.32} \quad (3)$$

On applying the floor function to equation (3), $$qp_{VC1} = \lfloor 10^{0.0429 * qp_{H.264} - 0.32} \rfloor \quad (4)$$

Equation (4) provides an approximate expression of the relation between QP of H.264 and VC1, i.e., given a quantization parameter of H.264, a quantization parameter of VC1 is determined, which would give the same bit-rate.

Figure 8:
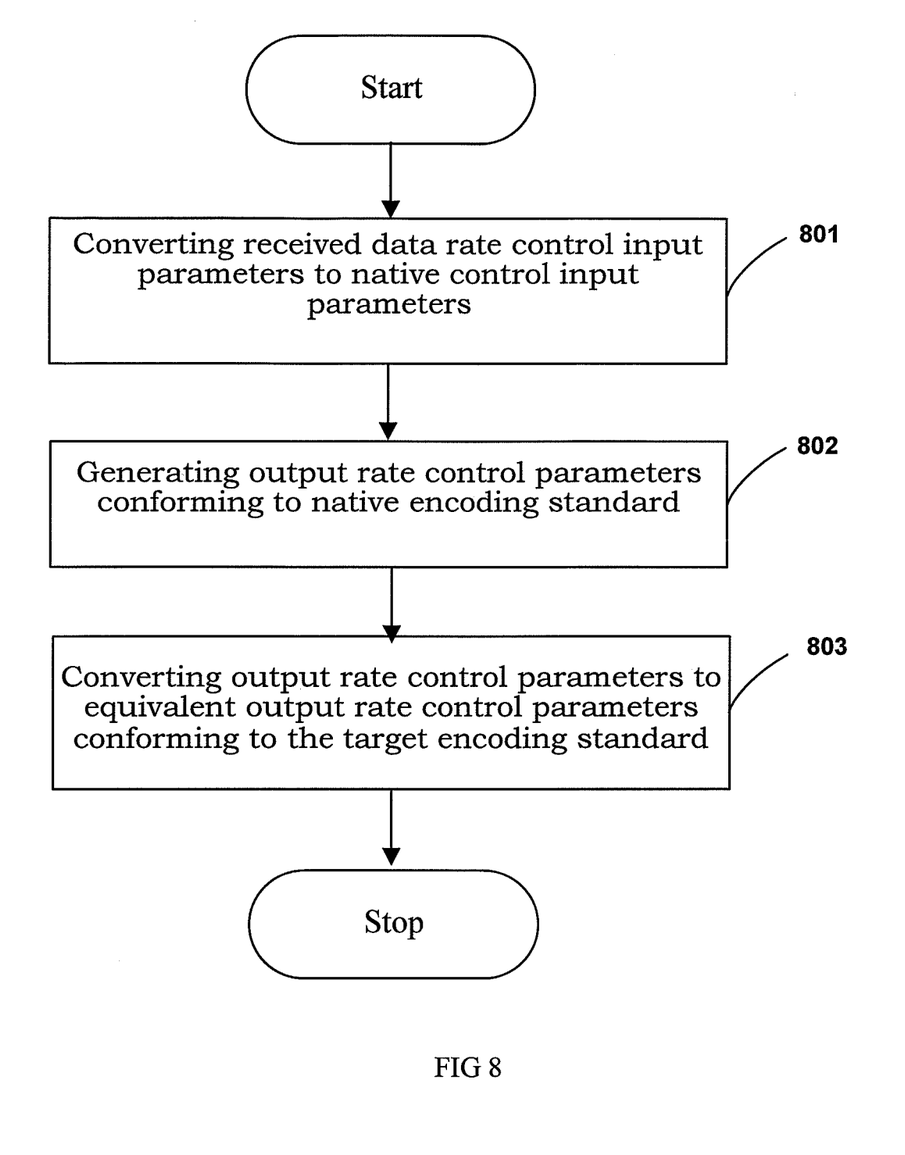
FIG. 8 illustrates a method for adapting a rate control algorithm according to an embodiment of the present disclosure.

An embodiment of a method for adapting a rate control algorithm is described in FIG. 8. The method is represented as a collection of blocks in a logical flow graph, which corresponds to a sequence of operations that can be implemented in hardware, software, or a combination thereof. The order in which the process is described is not intended to be construed as a limitation, and any number of the described blocks can be combined in any order to implement the process, or an alternate process. The method generates rate control input parameters of target encoding standard. The rate control output parameters for the target encoding standard are then provided by means of a rate controller and fed back to the data encoder.

Various embodiment of the present disclosure as described are used in applications, such as, video encoding, video recording, video processing and other video communications.

The disclosure shows and describes only the embodiments of the disclosure; however the disclosure is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the disclosure and to enable others skilled in the art to utilize the disclosure in such, or other, embodiments and with the various modifications required by the particular applications or uses of the disclosure. Accordingly, the description is not intended to limit the disclosure as disclosed herein. Also, it is intended that the appended claims be construed to include alternative embodiments.

Although the disclosure of an adaptive bias module and method has been described in connection with the embodiment of the present invention illustrated in the accompanying drawings, it is not limited thereto. It will be apparent to those skilled in the art that various substitutions, modifications and changes may be made thereto without departing from the scope and spirit of the disclosure.

What is claimed:

1. A method, comprising:
  receiving, for a macroblock encoded in accordance with a first encoding standard, bits used to encode a previous macroblock and a quantization parameter of said previous macroblock (qp1);

determining a new quantization parameter (qp2) for a second encoding standard as a function of the quantization parameter of said previous macroblock, said function comprising:

$$qp2 = 10^{a*qp1+b};$$

wherein a and b are constants; and outputting the bits used to encode the previous macroblock with the new quantization parameter.

2. The method of claim 1 wherein determining comprises mapping the quantization parameter of said previous macroblock (qp1) to the new quantization parameter (qp2) wherein the new quantization parameter (qp2) is determined in accordance with said function.

3. The method of claim 1, wherein the quantization parameter of said previous macroblock (qp1) is one of an H.264 standard quantization parameter or VC1 standard quantization parameter, and wherein the new quantization parameter (qp2) is the other of H.264 standard quantization parameter or VC1 standard quantization parameter.

4. The method of claim 1, further comprising:

receiving the output bits used to encode a previous macroblock and the new quantization parameter at a rate controller; and generating by the rate controller of a further quantization parameter (qp3) for use in encoding a current macroblock.

5. The method of claim 4, further comprising:

receiving the further quantization parameter (qp3);

determining a last quantization parameter (qp4) as a function of the further quantization parameter, said function comprising:

$$qp4 = 10^{c*qp3+d};$$

wherein c and d are constants; and encoding the current macroblock using the last quantization parameter.

6. The method of claim 5, wherein the further quantization parameter (qp3) is one of an H.264 standard quantization parameter or VC1 standard quantization parameter, and wherein the last quantization parameter (qp4) is the other of H.264 standard quantization parameter or VC1 standard quantization parameter.

7. The method of claim 5, wherein determining comprises mapping the further quantization parameter (qp3) to the last quantization parameter (qp4) wherein the last quantization parameter (qp4) is determined in accordance with said function.

8. A method, comprising:

receiving a first quantization parameter of a previous macroblock encoded in accordance with a first encoding standard;

mapping the first quantization parameter to a second quantization parameter for a second encoding standard;

generating by a rate controller of a third quantization parameter for the second encoding standard;

mapping the third quantization parameter to a fourth quantization parameter for the first encoding standard;

wherein said second quantization parameter is determined in said mapping in accordance with a logarithmic regression function applied to first quantization parameter;

wherein said logarithmic regression function is configured to provide said second quantization parameter for said first quantization parameter which would give a same logarithmic bit-rate for the first and second encoding standards; and wherein said fourth quantization parameter is determined in accordance with a logarithmic regression function applied to third quantization parameter.

9. The method of claim 8, further comprising encoding a current macroblock using the fourth quantization parameter.

* * * * *